Dec. 29, 1936.  G. J. STREZYNSKI  2,066,164
PROCESS OF PURIFYING AND DEWAXING MINERAL OILS
Filed June 27, 1935  2 Sheets-Sheet 1

WITNESS:

INVENTOR
George J. Strezynski
BY
ATTORNEYS.

Dec. 29, 1936.  G. J. STREZYNSKI  2,066,164

PROCESS OF PURIFYING AND DEWAXING MINERAL OILS

Filed June 27, 1935  2 Sheets—Sheet 2

WITNESS:
Rob P Kitchel.

INVENTOR
George J. Strezynski
BY
Busser and Harding
ATTORNEYS.

Patented Dec. 29, 1936

2,066,164

UNITED STATES PATENT OFFICE 2,066,164

PROCESS OF PURIFYING AND DEWAXING MINERAL OILS

George J. Strezynski, Poughkeepsie, N. Y., assignor to The De Laval Separator Company, New York, N. Y., a corporation of New Jersey Application June 27, 1935, Serial No. 28,655

7 Claims. (Cl. 196—21)

In the refining of paraffin base petroleums (including mixed base petroleums) for the production of lubricating oil, several procedures are required. It is necessary to remove impurities and compounds which are detrimental to the lubricating qualities. It is also necessary to remove all waxes down to certain temperatures, usually between 0° F. and 20° F., in order to prevent the oil congealing during cold weather.

The impurities are usually removed by chemical action with sulfuric acid. The reaction of $H_2SO_4$ with the impurities forms a so-called acid sludge which, being considerably heavier than the oil, precipitates and is removable by gravity or by centrifugal separation.

The waxy compounds require removal by two different methods, the necessity for which arises from the different character of the waxy compounds, which may be grouped into two general classes, one, the so-called amorphous waxes, having a buttery structure, and the other more of a crystalline structure, forming granules, flakes or needles, or even, when rapidly crystallized, massed into a semi-solid jelly-like material. Normally the amorphous waxes are heavier than the crystalline waxes, the latter carrying considerable oil. Due to the small gravity difference between crystalline wax and the oil and to the spongy structure of the crystals, they are difficult to separate by gravity or centrifugal force and such procedure is usually considered impracticable, but they are readily filtered, and the resultant cakes of wax, when allowed to lie in pans, will drain themselves of any remaining oil. The amorphous waxes, being of more homogeneous structure and consisting of fine particles, cannot be pressed or sweated, but, because of their greater concentration and higher gravity, are separable by gravity or centrifugal force.

Usually, therefore, paraffin base oils are purified and dewaxed by a multiple step process. In the dewaxing treatments the oils are first distilled to about 30% bottoms. The portion distilled over carries most of the crystalline waxes. The 30% residue contains most of the amorphous waxes. A fraction of the overhead is then refrigerated, pressed and sweated for the removal of the crystalline wax, called paraffin. The bottoms are acid-treated, refrigerated and centrifuged for the removal of amorphous wax, called petrolatum.

My invention comprises a process for purifying the oil and removing both kinds of waxes in one unitary process.

It has been proposed, after distilling off only a small fraction of light constituents, to subject the oil, in a batch treatment, successively to refrigeration and addition of acid (in the order specified or in the reverse order) and then by gravity settle out the resultant mixture of acid sludge and waxes. In such a process, the resultant product separates into an upper layer of clear dewaxed oil and a lower black layer of waxy acid sludge; but it also exhibits an intermediate phase, nearly white, between the sludge and the clear oil. The line of demarcation between the clear oil and this intermediate flocculent layer is, in most cases, very indistinct, the two phases gradually merging together. I have found that this intermediate phase has a particularly high viscosity index number. Its inclusion in the separated clear oil considerably increases the viscosity index number of the whole oil.

The gravity of this intermediate phase I have found to be so close to that of the clear and entirely dewaxed oil that its separation therefrom, either by gravity or by ordinary centrifuges, is impracticable. In gravity settlement so large a percentage of the oil must be carried off with the sludge that there is obtained a poor percentage yield of oil for a given amount of crude. In centrifugal treatment, wherein the oil and sludge discharges in continuous streams from the inner and outer zones, respectively, of the separating space of the bowl, it was found that the intermediate phase would accumulate in the vessel until it would discharge with the clear oil, which resulted in a poor pour point and waxy oil.

If oil containing only amorphous wax could be treated in accordance with the gravity settling method above described, it is possible that a more satisfactory product would be secured; but paraffin base oils always contain, it is believed, wax in both forms (whether present as such in the original crude or potentially present therein so as to be necessarily produced by refrigeration); and therefore such process is believed to possess no commercial value.

I have devised a process whereby the oil (which is preferably the crude oil with or without preliminary light distillation, but may be a long residuum containing all the lubricating fractions) may be both purified and completely dewaxed in a unitary process which may be carried out continuously and wherein the final separating step may be successfully effected by means of centrifugal force. In stating that the oil is completely dewaxed, it will be understood that what is meant is that the wax is completely removed down to the temperature of the pour point desired; in other words, that all such wax is precipitated and that all the precipitated wax is removed. In my process this is accomplished with a minimum loss of oil.

I shall describe the application of the process to a mixed base crude oil comprising gasoline about 29%, kerosene about 14%, gas oil about 21%, wax and asphaltic materials about 12% (wax alone about 8%) and lubricating oil constituents 17-18% which when separated have a pour point of 20° F., viscosity index 86 and viscosity 67 at 210° F.

To facilitate a description of the process, I illustrate various means whereby the process may be carried out.

Figure 1:
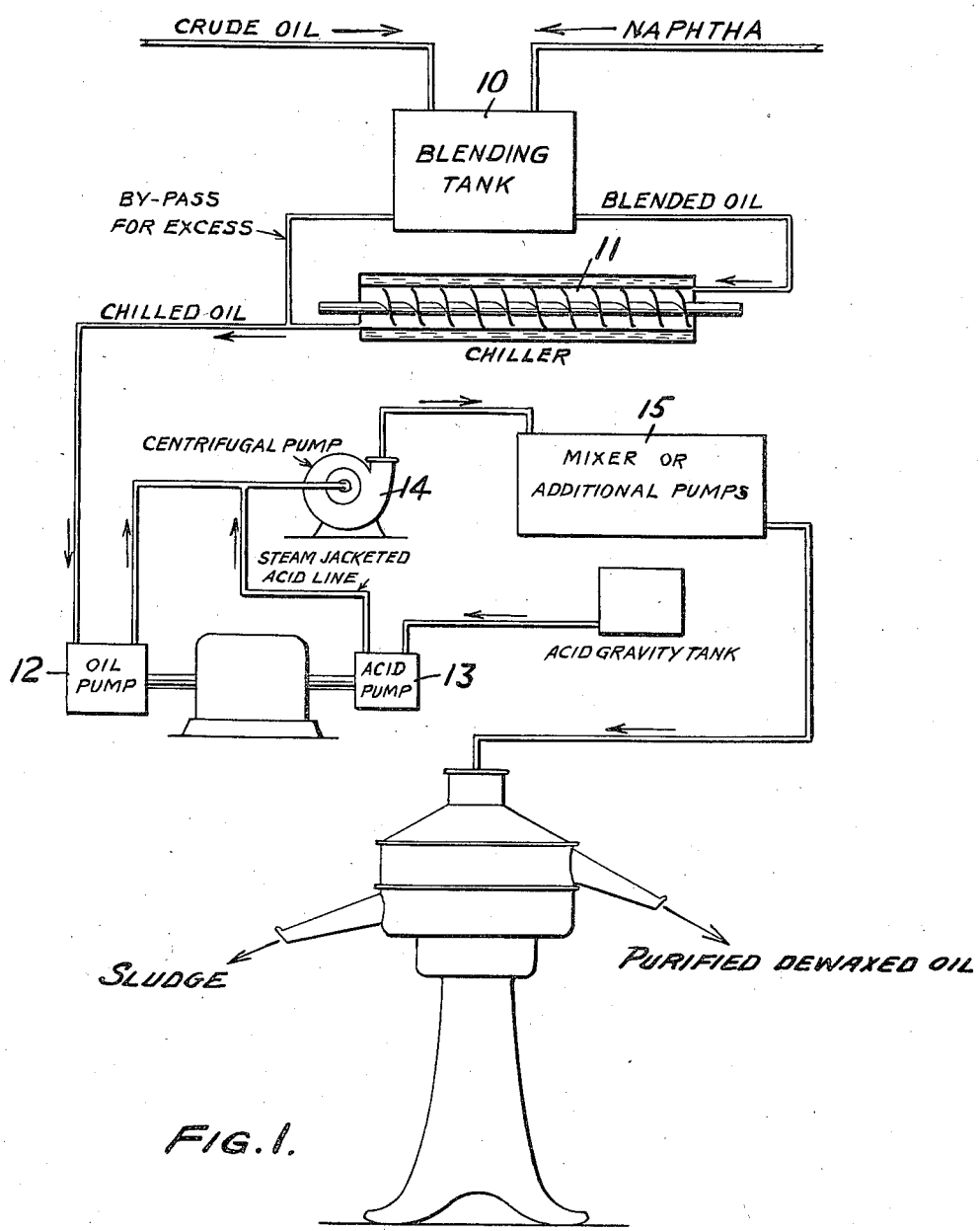
Fig. 1 is a flow sheet showing the entire apparatus.

As above stated, it is preferred to process the crude oil. If it contains water, it should be dehydrated; preferably, however, by a method which involves as little removal as practicable of light oil fractions. It is preferred to dewax the crude, since if all fractions except those desired for lubrication are distilled off, it is necessary to make a very considerable addition of a light oil fraction, such as naphtha, to the oil in order to decrease the specific gravity of the oil relatively to the wax, with the former of which the diluent has a preferential solvent action. Even starting with the crude, it is necessary, in the most desirable embodiment of the invention, to dilute with a light oil fraction. Starting with a crude containing about eight per cent. of wax, it is desirable to add about 70 parts of the diluent to 100 parts of the crude. The proportion of diluent that should be added is quite variable with different oils. I have found, however, that it is highly desirable to add to the crude a light hydrocarbon oil in such amount that there will form, in the chilled and acid treated oil, an acid sludge having a mass between 15 and 30 per cent. of the entire mass of the treated oil under a force of 6000 times that of gravity. Preferably this percentage should be between 20 and 25 per cent.

Separate streams of crude and diluent, in the specified proportions, are delivered to a blending tank 10, whence the oil is pumped through a chilling device 11, of the type known as a "ribbon chiller", which comprises a long cylinder through which extends a rotatable core provided with a helical conveyor wing. In such a chiller the oil is maintained in motion or agitation and spread over a considerable surface and is thereby rapidly chilled. The cooling procedure in such a chiller may be properly designated "shock chilling", although it will be understood that chilling at a slower rate is permissible, although not desirable. The temperature to which the oil is cooled will vary with the pour test desired for the finished oil. If such finished oil is desired to have a pour test of 20° F., chilling to about −16° F. is necessary. If the finished oil is desired to have a pour test of 0° F., chilling to about −35° F. is necessary. The degree of chilling may vary from 0° F. to −50° F., dependent on the pour test desired.

The chilling operation described will precipitate all the wax. By means of a pump 12, the mixture of oil and wax is conveyed to a mixer 14, which may be a centrifugal pump. Into the oil line leading to the mixer 14 is conveyed, through a pump 13, a stream of concentrated sulfuric acid (say 98% $H_2SO_4$). The amount of acid so conveyed may be quite variable, but I prefer to use a quantity of acid substantially in excess of that required for the reaction, since this much enhances the efficiency of the process and involves no substantial waste of acid; nearly all of it being recoverable, and the bulk of the acid recovered being concentrated acid adapted for reuse in the process. While the percentage of acid may be varied within limits at the discretion of the operator, the necessary percentage of acid will vary with the desired pour test of the finished oil. Thus, in producing 20° F. pour test oil, a desirable addition of acid is about 12 to 14 pounds per barrel, or about 2½%; while in producing 0° F. pour test oil, a desirable addition of acid is about 24 to 28 pounds, or about 5%.

It is important that the acid that is added should not freeze. To avoid freezing, I prefer that the temperature of the added acid should be nearly or quite 150° F., although this temperature may be varied within considerable limits, say between 110° and 175° F. Another advantage of adding hot acid is that it speeds the reaction. The addition of the acid necessarily raises the temperature of the mixture, for which reason the chilling should be carried to a temperature below that which would otherwise be necessary. In the examples given above, the mixture is raised in temperature, by the addition of the acid, from −16° F. to −6° F. or from −35° F. to −25° F. It is preferred not to complete the mixing in the pump 14 but to run it through an additional mixer 15, which may be a series of centrifugal pumps.

The acid reacts with the oil and wax and forms a mixture of waxy acid sludge and oil containing wax in fine suspension but otherwise purified.

Figure 2:
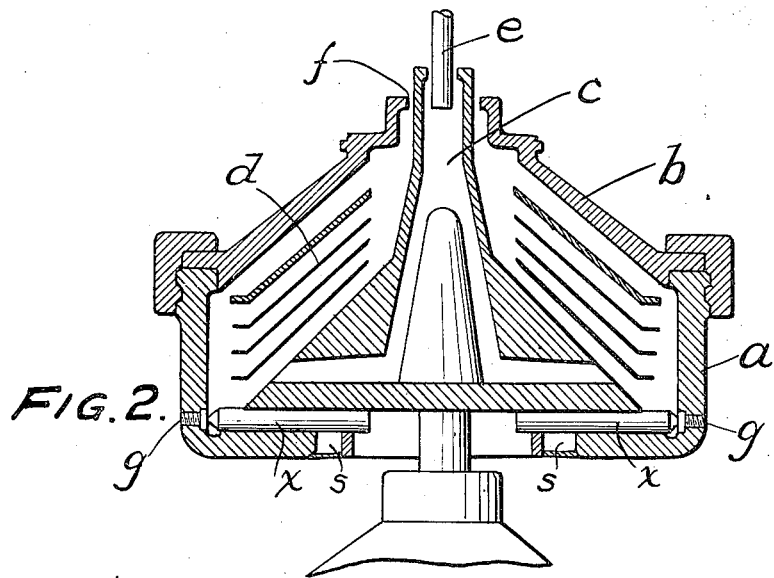
Fig. 2 is a vertical section through a preferred form of centrifuge.
Figure 3:
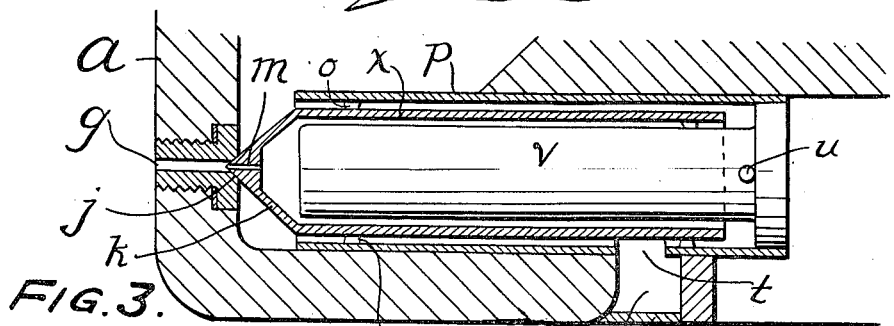
Fig. 3 is a section, on a larger scale and in more detail, of a part of the centrifuge of Fig. 2.

The mixture is then conveyed to a centrifuge which is specially designed to so act upon the mixture as to enable the recovery of completely dewaxed oil. A preferred construction of centrifuge is shown in Figs. 2 and 3 and will now be described in detail.

$a$ is the shell of a bowl having a top $b$ and containing a tubular feed shaft or distributor $c$ and a set of separating discs $d$. The feed to the bowl is through tube $e$ and feed shaft $c$ into the separating chamber of the bowl. The outlet for oil is at $f$ and that for sludge is at $g$.

In the bowl wall around the port $g$ is a valve seat $j$ against which seats a floating conical valve $k$ constituting the outer end of a radially extending hollow cylindrical body $x$. Through the apex of the cone $k$ is a small orifice $m$. Small lugs $o$ on the outside of the valve body $x$ centralize it in the tube $p$ which surrounds, protects and guides it. Supported and guided by a head secured to and fitting the inner end of the tube $p$ is a plug $v$ that nearly fills, but does not touch, the inside of the valve body $x$. Underneath the bowl a wall $q$ forms, with the bowl bottom, an annular chamber which, by radial partitions, is divided into as many compartments $s$ as there are valves. These compartments form auxiliary wax and oil separating chambers, as hereinafter described. In the side of each guide tube $p$ is a slot $t$ providing communication between chamber $s$ and the annular space between the valve body $x$ and tube $p$. The liquid flows from that part of said annular space communicating with the interior of the bowl into chamber s and flows out of chamber s into that part of said annular space communicating with the interior of the hollow valve body x. The cross pin u in the plug v limits the movement of the valve body x away from its seat.

With the use of the plug v only a small quantity of liquid needs to be drained from the chamber s in order to empty it of a substantial proportion of liquid.

In operation, oil that has been acid treated and so chilled that the acid sludge has been thrown out of solution is fed through the tube e and tubular shaft c to the interior of the bowl, where it enters the spaces between the discs d. At the same time oil enters each of the guide tubes p and causes the corresponding valve x to float toward the center until stopped by the pin u. Oil temporarily escapes through the port g, but oil quickly fills the tube p and space s and flows into and fills the valve x, which then moves outward and closes the port g.

Between the discs d the oil and wax are separated by centrifugal force. The dewaxed oil escapes from the bowl at f and the acid sludge collects in a layer against the bowl wall. As soon as this layer is thick enough to cover the end of the tube p it stops the flow of oil thereinto. The continuing escape of oil from the valve through the orifice m soon so lightens the valve that it floats radially inward in the body of oil in which it is immersed and opens the port g, allowing sludge to be discharged therethrough until the thickness of the sludge layer in the bowl is so reduced that it uncovers the end of tube p and the flow of oil from the interior of the bowl into tube p is then resumed. Said oil quickly replaces that which had escaped and fills the valve so that it again closes. This cycle of operations is repeated indefinitely.

While the action of this valve is actually intermittent, the open intervals and the closed intervals are both of such short duration that the resultant is substantially equivalent to a continuous discharge of wax as fast as it separates from the oil.

The oil that operates the valve is held in the chambers s for a time sufficiently long to effect therein a clean separation of its contained wax before the oil reaches the interior of the valve body. The clean oil can flow through the orifice m as fast as desired.

In the operation as above described, the oil that flows from the separating space of the bowl into the valve body x is only that part of the oil which, during the separation, is in a narrow annular zone adjacent the peripheral zone of acid sludge. I have found that it is only this zone of oil that contains wax in fine suspension. The remaining and major part (inner zone) of the body of oil that is at any given time in the separating chamber of the bowl contains substantially no suspended wax, so that the oil discharged through the outlet f is substantially completely dewaxed as well as otherwise purified.

It is not necessary to provide special separating chambers s. All the oil within and near to the peripheral layer of accumulated sludge around the edge of chamber p may flow into the interior of the valve body v and may be discharged, with the sludge, through the port g. The main advantage of separating out the wax before admitting the oil to the valve chamber is to avoid danger of clogging of the valve outlet by fine wax particles. The oil admitted into the valve body, whether or not wax is previously separated therefrom in chambers s, comprises a very minor proportion of the entire separated volume of oil and may be subsequently separated from the acid sludge by a process which need not be described, since it is no part of the present invention.

Figures 4, 5:
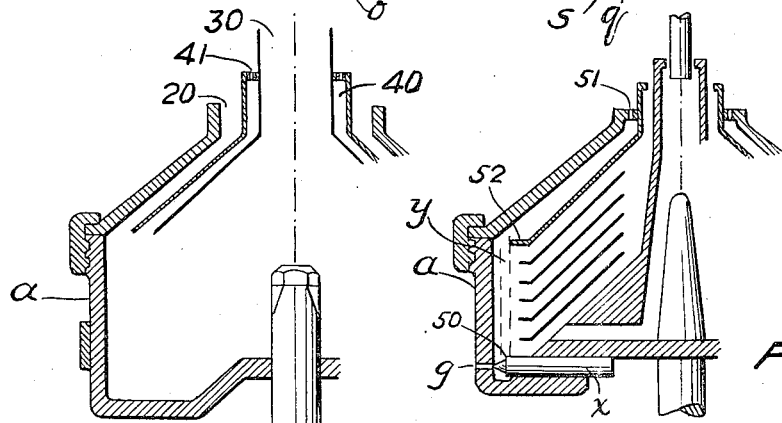
Figs. 4 and 5 are vertical sectional views of modified forms of centrifuges in which it is possible to carry out the process.

The process is not dependent for its execution upon the use of a centrifuge with floating valve as above described. The use, however, of a known three-way discharge bowl with the conventional discharge dams gives unsatisfactory results. When it was attempted to regulate these dams to corresponding gravities, it was found that there was not enough gravity differential and that the gravity differential was not stable enough to establish the proper diameter, which resulted in losing purified and dewaxed oil over the intermediate dams or not obtaining enough discharge from the intermediate dams to effect a complete removal of the intermediate phase. I then conceived the idea of providing discharges over any gravity controlled discharges, like dams, but to have the intermediate discharge restricted to a certain limited proportion by means of restricted outlets. The restriction must be of such character that the intermediate discharge varies from 5 to 20% of the total feed. The construction is illustrated in Fig. 4, wherein 30 is the discharge for the purified dewaxed oil, 20 the discharge for the waxy acid sludge and 41 the discharge for the intermediate phase. The latter discharge comprises plugs having restricted openings 41. The only objection thereto is that, since the location of the intermediate zone is determined by the 20 and 30 dams, if they are not set just right the intermediate zone may be too far in so that the orifices 41 will not drain the proper material.

Another workable arrangement is shown in Fig. 5, wherein the bowl is provided, as in Figs. 2 and 3, with a floating valve x, operating as hereinbefore described, but wherein the intermediate phase discharge is located independent of the valve but leading from the zone determined by the edge 50 and somewhat inside that diameter. In this construction the intermediate phase discharges through the restricted holes 51, the diameter of the top disc 52 being somewhat inside the edge of the tube p. y represents the zone of sludge-free but only partly dewaxed oil.

The process is not dependent for its execution upon acid-treating and chilling in the manner and in the order described. Thus, if the process is applied, for example, to a long residuum, wherein it is necessary to use a much larger proportion of diluent, it is practicable, and sometimes advantageous, to add the acid to the stock to be treated at room temperature or, say, at any temperature between 20° F. and 80° F. to chill only the diluent and to then add the chilled diluent to the acid treated stock. This modification of the process is practicable if the proportion of diluent is relatively high.

I do not herein claim, separate and apart from the process as a whole, certain novel features of the above described process, such as the regulation of the temperature of refrigeration and of the acid so as to prevent freezing of the acid and obtain a maximum degree of reaction, as set forth in an application filed by me June 27, 1935, Serial No. 28,656, and the regulation of the proportion of diluent added to give a proportion of sludge within certain limits, as set forth in an application filed jointly by George M. Pfau and myself July 25, 1935, Serial No. 33,073.

Nor do I claim herein the separator constructions herein described, since, while they are especially adapted to carry out my process, they are or may be used to advantage in other processes; and, moreover, it is possible to practice the present process in separators of other constructions. The separator shown in Figs. 2 and 3 is disclosed in a patent issued to me December 3, 1935, No. 2,022,816.

What I claim and desire to protect by Letters Patent is:

1. The process of substantially completely dewaxing mineral oil that contains both amorphous and crystalline waxes and which has been chilled to a temperature below 0° F. and reacted with sulfuric acid, which comprises subjecting the resultant mixture of oil and sludge to centrifugal force to thereby separate the same into a peripheral zone of acid sludge containing the major part of the wax, an inner zone of purified dewaxed oil and an intermediate zone of otherwise purified oil but containing wax in suspension, and discharging the purified dewaxed oil separately from the remaining separated constituents.

2. The process of substantially completely dewaxing mineral oil which has been chilled to a wax-precipitating temperature and reacted with sulfuric acid, which comprises continuously flowing the resultant chilled mixture of oil and acid sludge into a revolving separator bowl and therein separating the same into three phases, namely, a peripheral sludge phase, an inner pure oil phase and an intermediate phase comprising oil containing wax in suspension, separately discharging the three phases and so controlling the outlet for the intermediate phase as to limit the ratio of discharge of such phase to the total discharge to less than twenty per cent.

3. The process of substantially completely dewaxing mineral oil which has been chilled to a wax-precipitating temperature and reacted with sulfuric acid, which comprises continuously flowing the resultant chilled mixture of oil and acid sludge into a revolving separator bowl and therein separating the same into three phases, namely, a peripheral sludge phase, an inner pure oil phase and an intermediate phase comprising oil containing wax in suspension, continuously discharging the pure oil phase, alternately accumulating and discharging the sludge phase, outflowing the intermediate sludge phase from the separator space of the bowl during discharge and accumulation of the sludge phase, and temporarily arresting said outflow after a definite accumulation of the sludge phase.

4. The process of substantially completely dewaxing mineral oil which has been chilled to a wax-precipitating temperature and reacted with sulfuric acid, which comprises continuously flowing the resultant chilled mixture of oil and acid sludge into a revolving separator bowl and therein separating the same into three phases, namely, a peripheral sludge phase, an inner pure oil phase and an intermediate phase comprising oil containing wax in suspension, continuously discharging the pure oil phase, alternately accumulating and discharging the sludge phase, alternately outflowing the intermediate phase from the separating space of the bowl and arresting said outflow, outflowing the intermediate phase while the sludge phase is accumulating, arresting the outflow of the intermediate phase after a definite amount of the sludge phase has accumulated, starting the discharge of the sludge phase after the outflow of the intermediate phase has been arrested, and starting the outflow of the intermediate phase during the discharge of the sludge phase.

5. The process of substantially completely dewaxing mineral oil which has been chilled to a wax-precipitating temperature and reacted with sulfuric acid, which comprises continuously flowing the resultant chilled mixture of oil and acid sludge into a revolving separator bowl and therein separating the same into a peripheral zone of waxy acid sludge, an inner zone of purified dewaxed oil and an intermediate zone of oil containing wax in suspension, discharging from the separating space of the bowl the purified dewaxed oil, separately outflowing from the separating space of the bowl oil containing wax in suspension until a layer of sludge of predetermined thickness accumulates on the bowl wall and then arresting said outflow, intermittently discharging sludge from said accumulated layer to allow intermittent resumption of said outflow of oil containing wax in suspension, continuously discharging from the bowl the oil that has intermittently outflowed from the separating space of the bowl, and controlling said intermittent discharge of sludge by the specified intermittent outflow and continuous discharge of the last named oil.

6. The process of substantially completely dewaxing mineral oil which has been chilled to a wax-precipitating temperature and reacted with sulfuric acid, which comprises continuously flowing the resultant chilled mixture of oil and acid sludge into a revolving separator bowl and therein separating the same into a peripheral zone of waxy acid sludge, an inner zone of purified dewaxed oil and an intermediate zone of oil containing wax in suspension, discharging from the separating space of the bowl the purified dewaxed oil, intermittently discharging the sludge through an outlet in the peripheral wall of the bowl, intermittently outflowing from the separating space of the bowl, oil containing wax in suspension into a separate floating chamber in said bowl, said chamber with its contained oil being intermittently increased in weight by said flow of oil thereinto, continuously discharging the oil containing wax in suspension from said chamber to thereby gradually diminish its weight, and controlling the opening and closing of said peripheral outlet by moving said chamber, by varying its weight as specified, into and out of position to close said outlet.

7. The process of purifying and substantially completely dewaxing mineral oil which comprises adding thereto a hydrocarbon oil diluent in such amount that in the subsequent below-defined treating steps the waxy acid sludge will have a mass equal to 15 to 30% of the mass of the treated oil before separation, chilling the diluted oil to a temperature below 0° F. to precipitate the wax, reacting the chilled mixture of oil and wax with sulfuric acid, subjecting the chilled acid-treated mixture to centrifugal force to thereby separate the same into a peripheral zone of sludge, an inner zone of purified dewaxed oil and an intermediate zone of oil containing wax in suspension and discharging the purified dewaxed oil separately from the remaining separated constituents.

GEORGE J. STRZEZYNSKI.